United States Patent [19]

Hostler et al.

[11] Patent Number: 4,566,890

[45] Date of Patent: Jan. 28, 1986

[54] SELF PURGING FIN COOLER

[75] Inventors: Jonathan E. Hostler, Verona; Richard P. Beaver, Library, both of Pa.

[73] Assignee: PPG Industries, Inc., Pittsburgh, Pa.

[21] Appl. No.: 682,401

[22] Filed: Dec. 17, 1984

[51] Int. Cl.$^4$ .................................. C03B 37/02
[52] U.S. Cl. .............................. 65/12; 65/27; 134/198; 165/95
[58] Field of Search ............... 65/12, 27; 134/198, 134/148, 179; 165/95

[56] References Cited

U.S. PATENT DOCUMENTS

| | | |
|---|---|---|
| 3,475,148 | 10/1969 | Higginbotham . |
| 3,734,701 | 5/1973 | Pecoraro et al. ............... 65/27 |
| 3,837,832 | 9/1974 | Pecararo et al. ............... 65/27 X |
| 4,140,506 | 2/1979 | Machlan . |
| 4,141,709 | 2/1979 | Reese ............... 65/12 X |
| 4,330,311 | 5/1982 | Jensen . |

Primary Examiner—Robert Lindsay
Attorney, Agent, or Firm—John E. Curley

[57] ABSTRACT

A self purging fin cooler for use with a glass fiber forming bushing assembly is disclosed. A fin cooler header block is provided with a flow channel for coolant flow and a separate flow channel for cleaning liquid flow. A plurality of cleaning liquid distribution passages extend from the cleaning liquid flow channel to spray nozzles positioned between adjacent cooling fins that extend outwardly from the header block. Each spray nozzle produces a flat, fan shaped spray of cleaning liquid which removes contaminants that accumulate on the tops and sides of the cooling fins. A flow control valve assembly and frequency and duration timers are utilized to provide a controllable cleaning liquid spray frequency and duration. During non-spray periods a low volume of cleaning liquid to the spray nozzles insures that the nozzles will not become clogged.

12 Claims, 6 Drawing Figures

SELF PURGING FIN COOLER

FIELD OF THE INVENTION

The present invention is directed generally to a fin cooler for a glass fiber forming bushing assembly. More particularly, the present invention is directed to a self purging fin cooler for use with a glass fiber forming bushing. Most specifically, the present invention is directed to a self purging fin cooler utilizing periodical cleaning liquid sprays for fin contaminant removal from fin coolers during the formation of glass fibers from a bushing associated with the fin cooler. A cleaning liquid flow channel is formed in the fin cooler header block and supplies cleaning liquid to a plurality of spray nozzles placed between each of the cooling fins which extend outwardly from the header block. Each of the spray nozzles is shaped to provide a fan-shaped spray of cleaning liquid to the sides and top surfaces of two adjacent cooling fins. Liquid flow to the spray nozzles is controllable so that cleaning liquid can be sprayed onto the cooling fins at pre-selected spaced times and set durations.

DESCRIPTION OF THE ART

In the formation of glass fibers, molten glass is pulled or drawn through a plurality of closely spaced, small diameter apertures or tips on the bottom of a container used to carry the molten glass which is generally referred to in the art as a bushing. The molten glass emanating from the apertures or tips in the bushing, rapidly hardens and forms glass fibers or filaments which are then typically gathered and wound in packages or cut or chopped into discrete lengths for further processing. Since the diameter of the glass filaments formed by the bushing is largely a function of the glass temperature as it exits the bushing, assuming the aperture sizes to be constant as well as the fiber pulling speeds, the temperature of the glass in this region must be carefully controlled. This control is frequently accomplished through the use of fin coolers comprised generally of a fin header block having a plurality of generally elongated, flat cooling fins secured thereto with the fins extending into the glass fiber forming space immediately below the bushing tips. These fins remove heat from the glass filaments as they pass closely adjacent to the fin surfaces, and transfer this heat to the fin header block which is typically provided with cooling water flow passages or channels through which water flows to remove heat from the system.

During glass fiber formation, oxides of boron, sodium and other elements tend to volatilize from the glass surfaces of the fibers and deposit as a scale on the surfaces of the cooling fins. The amount of scale formation on the fins is dependent on glass composition and varies inversely with the fluorine concentration in the glass mix. With the advent of a low or zero fluorine glass composition has come increased deposits of boron oxide on the surfaces of the fin coolers. Fluorine has been found to react with boron oxide to form a noncondensing gas. Without fluorine, the boron oxide rapidly accumulates as a solid on the surfaces of the cooling fins.

Buildups of boron oxide and other contaminant scales on the surfaces of the cooling fins have an adverse effect on fin cooler operation. In eight hours of operation, a dulled, scaled fin surface can account for a 30% change in heat transfer. In the first two days of operation of a standard fin cooler, a 20°-25° F. increase in bushing temperature may be necessary to maintain the temperature of the glass filaments at the desired point since contaminant buildup on the fin surfaces during this period effectively increases the surface area of the fins and causes the contaminant coated fins to remove additional heat. Bushings are electrically heated and increasing bushing temperatures then results in increased costs. Further, the bushings which are generally constructed of precious metals such as platinum and alloys of platinum should be maintained at as low a temperature as practical to avoid the bushing bottom metal from sagging excessively and causing a consequent interruption of the process. Fin surface fouling is a function of glass batch composition and other variable factors so it is difficult to accurately compensate for fin cooler heat transfer rate changes due to surface fouling. Production of uniform glass filaments is thus likely to be difficult since the temperature in the fin cooler area varies due to increasing heat removal caused by contaminant buildup on the fins surfaces. Excessive buildup of scale can reach a point that filaments passing adjacent fins contact the scale containing surface causing the bushing to break out thereby interrupting the forming process.

Various previous attempts have been made to remedy the problems of fin surface fouling. For example, U.S. Pat. No. 3,475,148 to Higginbotham discloses an apparatus and method for production of glass filaments wherein a spray of a fluid is directed against the bottom surface of the cooling fins. The patent indicates that the spray causes a chilling of the contaminants on the fin members resulting in the contaminants breaking away from the fin member. While this procedure may lessen contaminant buildup, it would appear that it would also cause fin temperature fluctuations that might interfere with production consistency. It also requires the spray of chilled fluid toward the bushing bottom which will be difficult to control so that the bushing bottom is not cooled. Cooling of the bushing bottom in the area of the orifices or tips is to be avoided since it will affect glass viscosity at the orifices and hence cause glass fiber diameter variations.

In U.S. Pat. No. 4,140,506, there is disclosed a method for processing glass involving the utilization of a moving gas environment above the fin coolers in an attempt to lessen contaminant build up on the fin surfaces. Such a continuous flow of gas such as hydrogen fluoride or of a water vapor or stem introduces an additional ingredient into the area in which the glass filaments are being formed and may again adversely affect production quality. It also may introduce heat to an already hot environment, and can contaminate the atmosphere with a potentially irritating gas if not properly controlled.

It will thus be seen that the need exists for a method of fin cooler contaminant buildup prevention and for apparatus to accomplish the prevention of cooling fin fouling that is effective and economical, that does not interfere with normal fiber forming operations, and that does not introduce additional contaminants into the area adjacent to the fin surfaces. Further, the means for preventing fouling of the fin surfaces should be automatic, should be adjustable in accordance with glass batch compositions fed to the bushings, should be effective to remove contaminants without dissipating bushing heat, and finally must be dependable and operable for long periods of time without breakdown. Should such a breakdown occur, it must be rapidly correctable to prevent interruption of the operation of the glass fiber forming apparatus.

SUMMARY OF THE INVENTION

It is an object of the present invention to provide a self purging fin cooler.

A further object of the present invention is to provide a self purging fin cooler that is automatic.

Another object of the present invention is to provide a self purging fin cooler that is adjustable.

Yet a further object of the present invention is to provide a self purging fin cooler which requires little fluid useage.

Still another object of the prevent invention is to provide a self purging fin cooler having fluid spray nozzles.

Yet still another object of the present invention is to provide a self purging fin cooler which does not dissipate bushing heat.

An additional object of the present invention is to provide a self purging fin cooler assembly having easily replaceable fluid spray nozzles.

A further object of the present invention is to provide a fin cooler assembly with adjustable spray nozzles. These and other objects of the invention will be apparent from the ensuing description.

As will be set forth in greater detail in the description of the preferred embodiment, the self purging fin cooler in accordance with the present invention includes a fin header block having a flow channel through which a cleaning liquid is passed. A plurality of small fluid flow passages extend from this main flow channel with each of the small passages terminating at a spray nozzle which is secured to the header block between two adjacent cooling fins. Each such nozzle is structured to produce a generally fan shaped spray of the cleaning liquid. This spray contacts the top and side surfaces of adjacent cooling fins and removes contaminant buildup thereon. Control means are provided for effecting automatic operation of the spray nozzles. The duration of the fluid spray and its frequency can both be controlled depending on the composition of the glass batch and hence the rapidity with which the fins become coated with contaminants. The spray nozzles are readily removable from the fin header block so that in the unlikely instance of a spray nozzle becoming clogged, it can be quickly and easily removed and either cleaned or replaced.

The self purging fin cooler in accordance with the present invention provides automatic fin cleaning which can be controlled to occur during the doff cycle of the winder, i.e., when the winder is shut down to remove the fiber glass strand package wound thereon, or at other times when glass filament formation has been temporarily interrupted or curtailed, while not adversely effecting fin cooler operation during normal fiber attenuation. A minimal two second fluid spray once every two hours is sufficient to completely remove boron containing glass volatile deposits from the fin members. The flat fan shaped spray produced by the spray nozzles is effective in contacting the top and side surfaces of the fin plates while at the same time preventing any oversprays that might cool the bushing tip plate and thereby hamper proper filaments attenuation.

An automatic timer means for fluid spray control allows the frequency and duration of the liquid supply to the spray nozzle to be readily set and changed. Since the formation of glass volatile deposits is a function of glass batch composition, changes in this composition will change the rate of fin cooler surface fouling. By controlling the will change the rate of fin cooler surface fouling. By controlling the cleaning spray frequency and duration, the self purging fin cooler can be adapted to a given glass composition and fin scale buildup rate.

Although clogging of the spray nozzles is unlikely to occur, the nozzles are secure in the fin cooler header block by screw threads and can rapidly be removed. The nozzle themselves have a very simple spray pattern defined by a slot and a simple central liquid flow passage. A filter may be provided in the fluid flow line to the fin cooler header block in an effort to remove any particles from the cleaning liquid before the fluid passes through the spray nozzles. This function insures that the spray nozzles will not become plugged or clogged.

The self purging fin cooler in accordance with the present invention and the method of fin cleaning and contaminant removal which it affords, provides a substantial advance in the art. The apparatus operates in an automatic and adjustable manner to completely eliminate film scale buildup thus reducing fin maintenance and extending fin life. Further, the operation of the bushing is not compromised nor need fiber attenuation when operating the cleaning cycles be interrupted.

BRIEF DESCRIPTION OF THE DRAWINGS

While the novel features of the self purging fin cooler in accordance with the present invention are set forth with particularity in the appended claims, a full and complete understanding of the invention may be had by referring to the description of the preferred embodiment as set forth hereinafter and as may be seen in the accompanying drawings in which:

DESCRIPTION OF THE PREFERRED EMBODIMENT

Figure 1:
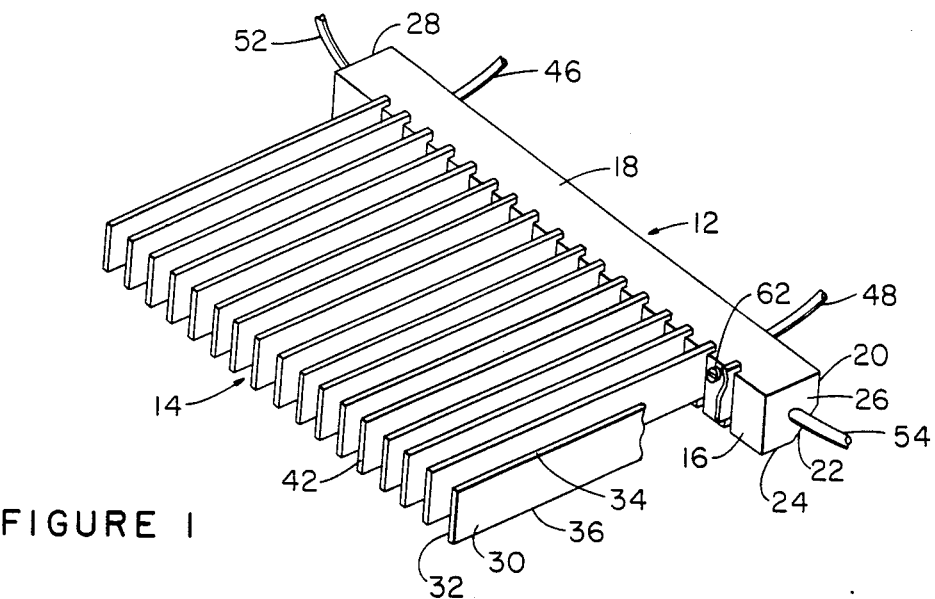
FIG. 1 is a perspective view of a self purging fin cooler in accordance with the present invention.

Referring initially to FIG. 1, there may be seen generally at 10 a self purging fin cooler in accordance with the present invention. Self purging fin cooler 10 is comprised generally of a fin cooler header block 12 to which are attached a plurality of elongated, flat cooling fins, generally at 14. It will be understood that fin cooler 10 is generally conventional in structure and operation and is intended for use with a glass fiber forming bushing. Since the cooperation of such bushing and fin cooler assemblies is quite well known, as shown in U.S. Pat. Nos. 2,908,036 and 3,251,665 as well as pages 106–107 of the book "The Manufacturing Technology of Continuous Glass Fibers", K. Lowenstein, N.Y., 1973, it will be sufficient at this point to merely indicate that the fin cooler is placed generally beneath the bushing tip plate so that the attenuated glass filaments pass between the plurality of spaced cooling fins 14. These fins 14 remove heat from the strands and transfer this heat to the header block 12 where it is dissipated, usually by coolant flow through the header.

Figure 2:
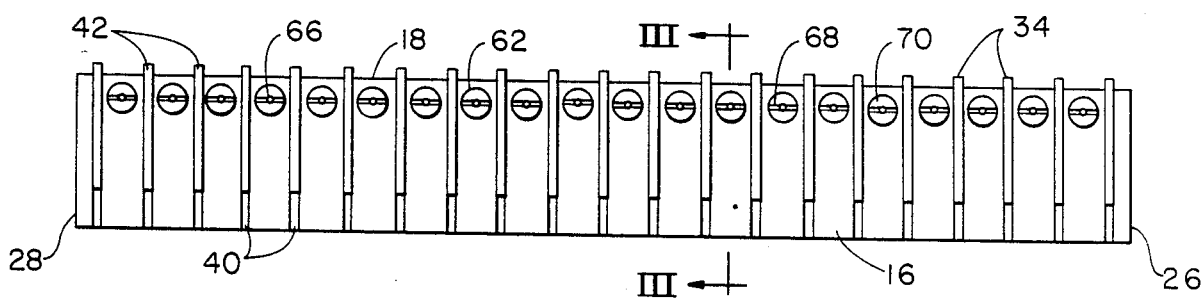
FIG. 2 is a front elevation view of the self purging fin cooler of FIG. 1.
Figure 3:
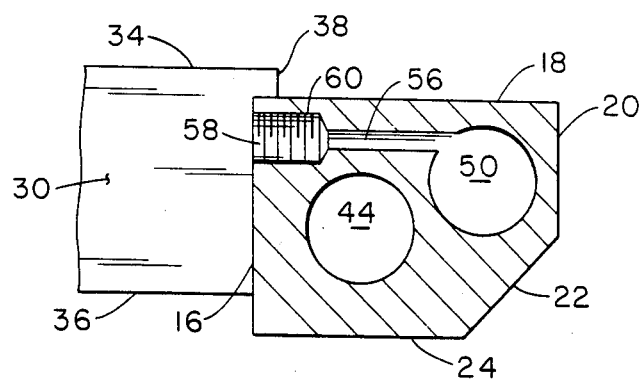
FIG. 3 is a cross-sectional view of the self purging fin cooler of the present invention, taken along line III—III of FIG. 2, and with the spray nozzle removed for clarity.

As may be seen in FIGS. 1, 2, and 3, header block 12 includes a front face 16, a top surface 18, rear surfaces 20 and 22, and a bottom 24. End walls 26 and 28 are formed at opposed ends of the header block 12 of self purging fin cooler 10. Each cooling fin 14 is generally a thing flat rectangular plate having generally vertical side surfaces 30, 32, a top surface 34 and a bottom 36. Each cooling fin 14 is secured at a first end 38 in a vertical slot 40 formed on the front face 16 of header block 12. Securement of fin 14 in slot 40 can be accomplished by any conventional means such as soldering. Each cooling fin 14 extends generally perpendicularly from header block 12 in a cantilever manner with a free second end 42 of each fin 14 being unsupported.

Figure 5:
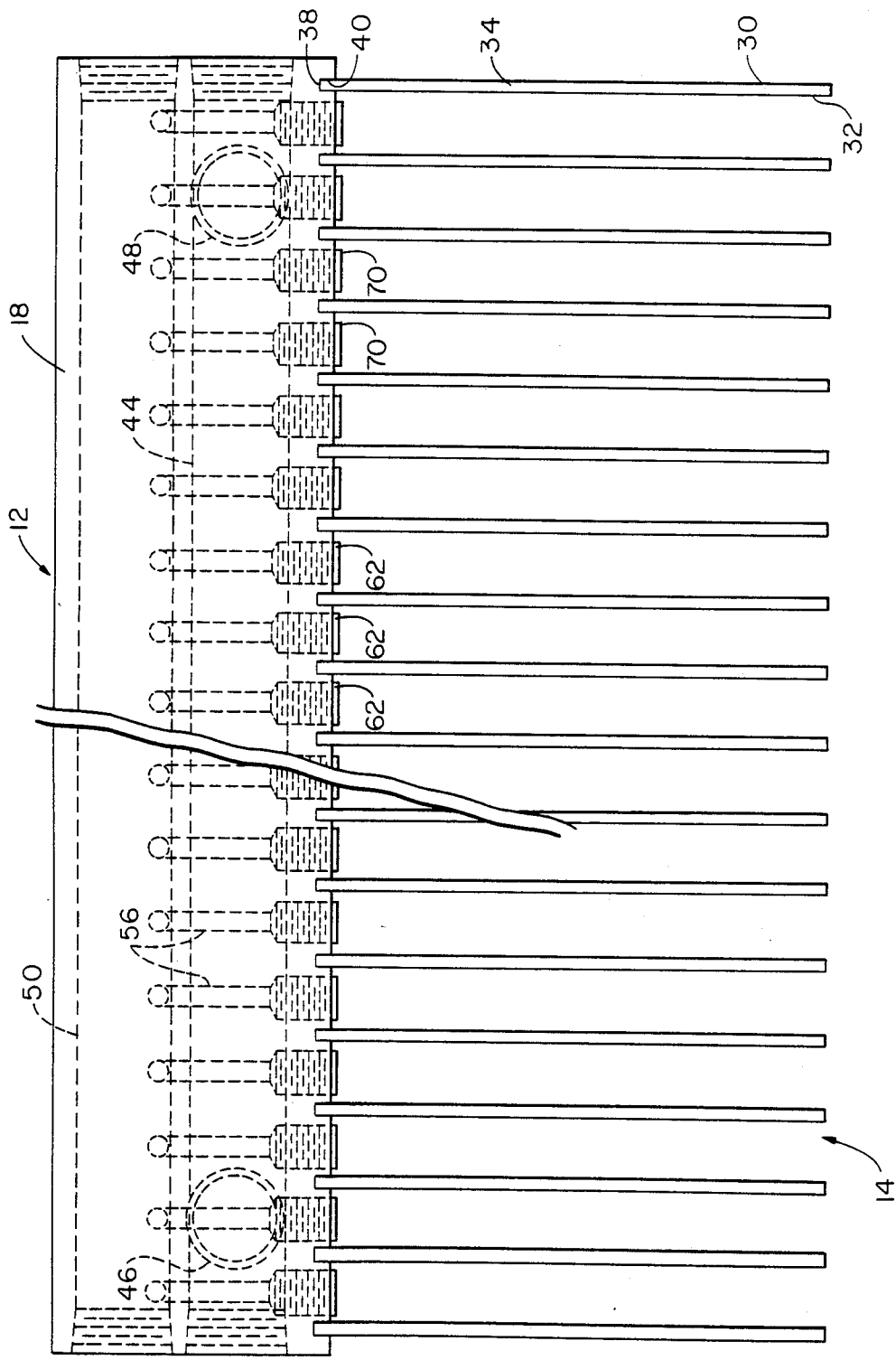
FIG. 5 is a top plan view of the self purging fin cooler of the present invention.

A pair of separate fluid flow channels are provided in header block 12, as may be seen in FIGS. 3 and 5. Coolant liquid flow channel 44 extends the length of header block 12 and is connected to inlet and outflow lines 46 and 48, respectively as seen in FIGS. 1 and 5. Suitable coolant such as plant water is passed through coolant channel 44 to control the amount of heat removed from header block 12 and thus by the cooling fins 14 which surround the glass filaments as they are formed. A cleaning fluid channel 50 is also formed in header block 12 and extends the length of header block 12, as may be seen in FIG. 5. Suitable inlet and outflow cleaning fluid lines 52 and 54, shown in FIG. 1, respectively, are provided for the cleaning fluid channel 50. A plurality of spaced cleaning fluid distribution passages 56 extend forwardly in the header block 12 from cleaning fluid supply channel 50, and are generally perpendicular to the longitudinal axis of the cleaning fluid channel 50. Each cleaning liquid distribution passage 56 terminates at a purge port 60 formed in the front face 16 of header block. Each purge port 60 is located between two adjacent cooling fins 14 and is formed in front face 16 of header block 12 generally toward the top surface 18 thereof. Each purge port 60 is internally threaded.

Figure 4:
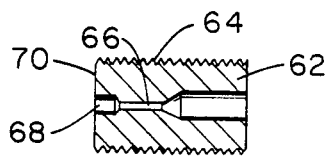
FIG. 4 is a cross-sectional side view of a spray nozzle for the self purging fin cooler of the present invention.

A purge port set screw 62 having a threaded outer surface 64, as may be seen in FIG. 4, is securable in each purge port 60, as may be seen in FIGS. 1, 2 and 5 and becomes a cleaning liquid spray nozzle. Each purge port set screw 62 includes a central axially extending cleaning fluid flow bore 66 which delivers cleaning fluid to a generally horizontal slot 68 formed in the front planar face 70 of each set screw 62. This slot 68 performs two diverse yet important functions. Initially, it receives the blade of a screwdriver so that each set screw 62 can be screwed into or out from its associated purge port 60. Once the set screw 62 is in place, the horizontal slot 68 functions to form a generally planar fan shaped spray of the cleaning fluid which passes through cleaning fluid channel 50 to the individual distribution passages 56 and then out through flow bores 66 to strike the sides 30 and 32 and the tops 34 of adjacent cooling fins 14 to effect cleaning thereof. Placement of the set screws 62 and their horizontal spray shaping slots 66 generally at the upper portions of front face 16 of header block 12 insures that cleaning fluid will be sprayed on the tops 34 of the fins 14 as well as the sides thereof. Further, the generally flat fan shaped spray does not contact the tip plate of the bushing so that cooling of the tip plate is averted.

Figure 6:
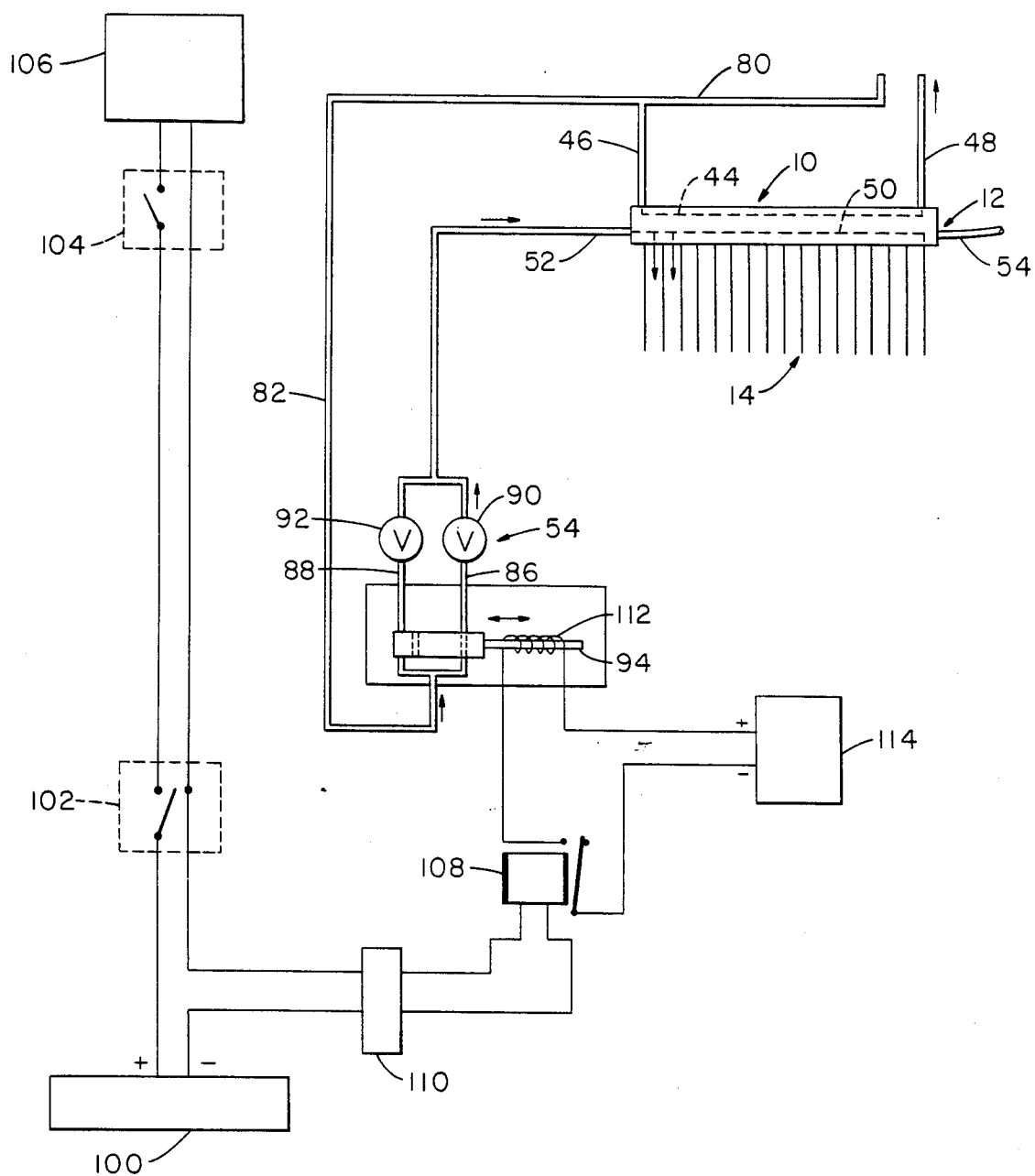
FIG. 6 is a schematic view of the self purging fin cooler and showing the electric control circuit and fluid flow lines.

Referring now to FIG. 6, the operation of the self purging fin cooler in accordance with the present invention will now be discussed. A plant water supply line is shown generally at 80 and provides cooling water to the coolant inflow line 46 which delivers coolant water to the coolant flow channel 44 in header block 12 of self purging fin cooler 10. The plant water supply line 80 is branched at its connection to coolant inflow line 46 and a branch supply line 82 is directed to a flow control valve assembly, generally at 84. Upon entry to the flow control valve assembly 84, the supply line 82 is split between a low pressure cleaning fluid supply path 86 and a high pressure cleaning fluid supply path 88. Low pressure supply path 86 is provided with a low pressure control valve 90 while high pressure supply path 88 is provided with a high pressure control valve 92. A solenoid actuated, spring biased flow directing valve 94 is placed in the branched supply line 82 and is normally biased to allow flow through the low pressure side 86 of the flow control valve assembly 84. On the outflow side of the flow control valve assembly 84, the cleaning liquid supply line recombines and directs cleaning fluid flow to cleaning fluid flow channel 50 through cleaning fluid inflow line 52. During normal bushing operation only a low pressure, low volume flow of cleaning liquid is supplied through low pressure supply path 86 in flow control valve assembly 84 to the purge port set screws 62 in header block 12. This small flow of cleaning fluid keeps the cleaning fluid flow bores 66 in set screws 62 from becoming plugged or otherwise obstructed.

A power supply, shown schematically at 100, is connected through a bypass switch 102 and a power on/off switch 104 to a winder 106. When both bypass switch 102 and power switch 104 are placed in the winder on position, power from power supply 100 is directed to winder 106 which then operates to wind glass fiber filaments pulled from the bushing and cooled by the self purging fin cooler 10. A relay 108 is also connected to power supply 100 through sn adjustable long duration timer 110. By way of example, long duration timer may be set to cycle through a period as long as two or more hours. With bypass switch 102 set in either of its two positions; i.e., allowing power to pass to the winder 106 through winder power on/off switch 104, and to long duration timer 110, or alternatively allowing current to flow only to the long duration timer 110, power is always provided for operation of the long duration timer 110.

Relay 108 is normally open, as shown in FIG. 6 so that no power is supplied to solenoid actuated valve 94. Thus the spring bias applied to the valve 94 keeps the valve positioned as shown in FIG. 6 so that cleaning fluid flow is through the low pressure supply path 86. Once long duration timer 110 has cycled on, power is supplied to relay 108 to close the relay and supply current to the winds 112 of the solenoid which controls valve 94. The valve then is shifted by the solenoid to direct cleaning liquid flow through the high pressure side 88 of flow control valve assembly 84 and through the high pressure control valve 92 to cleaning fluid in flow line 52 so that high pressure cleaning fluid passages into cleaning fluid channel 50 and out through the cleaning fluid distribution passages 56 to the pure port set screws 62 and their flow bores 66 to form a high pressure fluid spray at the horizontal slot nozzles 68.

A short duration timer 114 is placed in series with relay 108 and controls the length of time of energization of solenoid windings 112 and hence the duration of the high pressure cleaning liquid sprays formed by slotted nozzles 68. Once the pre-selected time of operation of shot duration timer 114 has expired, the spring biased valve 94 returns to its low pressure flow position. It will be understood that on time for long duration timer 110 is greater than the longest selectable on time for short duration timer 114.

The frequency of the cleaning spray required by self purging fin cooler will, as we discussed previously, depends on the composition of the glass being supplied to the bushing assembly. In normal useage in which the winder is being used, the long duration timer's cycle time can be adjusted to coincide with the winder's cycle time so that cleaning sprays will occur during winder shut off periods when the winder is being doffed, i.e., the package wound thereon is being removed. When the winder is not being utilized, such as in a situation in which the glass fibers are being fed directly to a chopper, the by pass switch can be placed in the winder bypass position so that power is still being supplied to the long duration timer.

High pressure cleaning sprays are provided at frequencies dictated by the long duration timer 110 and for durations set by the short duration timer 114. Since the cleaning sprays do not adversely affect bushings tip plate temperature and similarly do not substantially affect the heat removal rates of the fin cooler, cleaning spray frequencies and durations can be selected independently of winder or bushing operating modes.

In operation it has been found that 2 second spray durations of cleaning liquid at frequencies of 2 hours has been sufficient to completely remove boron containing glass volatile deposits from the fin members. The horizontally slotted nozzles in the purge port set screws direct a flat fan spray of cleaning liquid to the fins, thereby eliminating water oversprays and averting any tip plate cooling. Plugging of the flow bores in the purge port set screws is eliminated by use of the continuous low pressure flow of cleaning liquid to the spray nozzles, and by an in-line filter (not shown) which can be placed in cleaning fluid in flow line 52 and virtually eliminates any nozzle clogging. Should such clogging ever occur, the set screws can be readily removed, cleared and replaced. With a flow bore of 0.0625 inches and with a water pressure of 40 psi, a water delivery flow of 0.017 gallons per minute or 0.05 milliliters per second to each purge port is provided. As indicated above, this has been found to be sufficient to completely remove boron containing glass volatile deposits from the cooling fin surfaces without affecting the operation of the bushing assembly.

While a preferred embodiment of a self purging fin cooler in accordance with the present invention has been set forth fully and completely hereinabove, it will be obvious to one of skill in the art that a number of changes in, for example, the fluid flow rates and pressures, the number of cooling fins and spray nozzles, the overall shape of the header block, and the like could be made without departing from the spirit and scope of the subject invention which is accordingly to be limited only by the following claims.

We claim:

1. A self purging fin cooler useable with a glass filament forming bushing, said self purging fin cooler comprising:
   a fin cooler header block having a coolant liquid flow channel, a separate cleaning liquid flow channel, and a plurality of spaced, parallel cooling fins affixed at first ends to a front face of said header block and extending outwardly therefrom;
   means to flow coolant liquid through said coolant liquid flow channel and means to flow cleaning liquid to said cleaning liquid flow channel;
   cleaning liquid distribution passages extending from said cleaning liquid flow channel and terminating at said front face of said header block with one of said distribution passages terminating between each two adjacent ones of said cooling fins;
   a removable spray nozzle secured in each of said liquid distribution passages at said front face of said header block; and
   means to intermittently supply cleaning liquid at high pressure to said spray nozzles for impingement against said cooling fins.

2. The self purging fin cooler of claim 1, wherein said cleaning liquid distribution passages are threaded at their ends adjacent said front face of said header block and further wherein said spray nozzles are screwed into said threaded passages.

3. The self purging fin cooler of claim 2, wherein each of said spray nozzles has a slot in a front face thereof.

4. The self purging spray nozzle of claim 3, wherein said slot in each of said spray nozzles is positioned generally perpendicularly to side portions of said cooling fins.

5. The self purging fin cooler of claim 1, wherein said means to intermittently supply high pressure cleaning liquid to said spray nozzles includes a flow control valve assembly positioned intermediate a supply of said cleaning liquid and said spray nozzles.

6. The self purging fin cooler of claim 5, wherein said flow control valve assembly includes a spring biased, solenoid actuated valve.

7. The self purging fin cooler of claim 1, wherein said means to intermittently supply high pressure cleaning liquid to said spray nozzles includes spray frequency and duration control means.

8. The self purging fin cooler of claim 1, further includes means to supply low pressure cleaning liquid flow to said spray nozzles in the absence of said high pressure cleaning liquid flow whereby clogging of said spray nozzles is prevented.

9. The self purging fin cooler of claim 1, wherein said cleaning liquid is water.

10. The self purging fin cooler of claim 1, wherein each of said spray nozzles has a slotted front face which produces a generally flat, fan shaped spray.

11. The self purging fin cooler of claim 1, wherein each of said spray nozzles is positioned at said front face of said header block generally adjacent a top surface of said header.

12. The self purging fin cooler of claim 11, wherein each of said spray nozzles produces a flat, fan shaped spray of cleaning liquid which contacts top and side surfaces of adjacent ones of said cooling fins.

* * * * *